US011616239B2

(12) United States Patent
Song et al.

(10) Patent No.: US 11,616,239 B2
(45) Date of Patent: Mar. 28, 2023

(54) MANUFACTURING METHOD OF LARGE AREA THIN FILM ANODE SUPPORTED PLANAR SOFC

(71) Applicant: KOREA INSTITUTE OF ENERGY RESEARCH, Daejeon (KR)

(72) Inventors: Rak Hyun Song, Seoul (KR); Amjad Hussain, Daejeon (KR); Dong Woo Joh, Sejong-si (KR); Jong Eun Hong, Daejeon (KR); Seung Bok Lee, Daejeon (KR); Tak Hyoung Lim, Daejeon (KR); Tae Hun Kim, Daejeon (KR); Beom Su Kwon, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 17/563,817

(22) Filed: Dec. 28, 2021

(65) Prior Publication Data

US 2022/0209251 A1   Jun. 30, 2022

(30) Foreign Application Priority Data

Dec. 29, 2020  (KR) .......................... 10-2020-0186703

(51) Int. Cl.
*H01M 4/88* (2006.01)
*H01M 4/86* (2006.01)

(52) U.S. Cl.
CPC ....... *H01M 4/8896* (2013.01); *H01M 4/8668* (2013.01); *H01M 4/8857* (2013.01); *H01M 4/8885* (2013.01)

(58) Field of Classification Search
None
See application file for complete search history.

(56) References Cited

U.S. PATENT DOCUMENTS

| 5,922,486 | A | * | 7/1999 | Chiao | ................. | H01M 8/2432 |
| | | | | | | 429/495 |
| 2006/0197264 | A1 | * | 9/2006 | Cutler | ................. | H01M 8/2404 |
| | | | | | | 264/618 |
| 2009/0068373 | A1 | | 3/2009 | Lee et al. | | |
| 2013/0273456 | A1 | | 10/2013 | Bae et al. | | |
| 2020/0091538 | A1 | * | 3/2020 | Pan | ..................... | H01M 8/1253 |

FOREIGN PATENT DOCUMENTS

| KR | 10-2011-0057932 A | 6/2011 |
| KR | 10-2011-0057938 A | 6/2011 |
| KR | 10-2012-0000337 A | 1/2012 |
| KR | 10-1238889 B1 | 3/2013 |
| KR | 10-2013-0077306 A | 7/2013 |

* cited by examiner

*Primary Examiner* — Haroon S. Sheikh
(74) *Attorney, Agent, or Firm* — Birch, Stewart, Kolasch & Birch, LLP (57) ABSTRACT

Disclosed is a method for manufacturing a large-area thin-film solid oxide fuel cell, the method including: preparing an anode support slurry, an anode functional layer slurry, an electrolyte slurry, and a buffer layer slurry for tape casting; preparing an anode support green film, an anode functional layer green film, an electrolyte green film, and a buffer layer green film by tape casting the slurries onto carrier films; staking the green films, followed by hot press and warm iso-static press (WIP), to prepare a laminated body; and co-sintering the laminated body.

12 Claims, 9 Drawing Sheets
(8 of 9 Drawing Sheet(s) Filed in Color)

MANUFACTURING METHOD OF LARGE AREA THIN FILM ANODE SUPPORTED PLANAR SOFC

CROSS REFERENCE TO RELATED APPLICATIONS

This non-provisional application claims the benefit under 35 U.S.C. § 119(a) to Patent Application No. 10-2020-0186703, filed in Republic of Korea on Dec. 29, 2020, all of which are hereby expressly incorporated by reference into the present application.

BACKGROUND OF THE INVENTION

1. Field of the Invention

Various embodiments of the present disclosure relate to a method for manufacturing a large-area thin film solid oxide fuel cell. Specifically, various embodiments of the present disclosure relate to a method for manufacturing a large-area thin film solid oxide fuel cell through co-sintering.

2. Description of the Prior Art

Fuel cell technology has a very large ripple effect on other industries, such as the power generation industry for home or industrial power generation devices, the automobile industry for driving devices substituting for existing internal combustion engines, the electronic device industry for alternative power sources for existing batteries, and the like. Of these, solid oxide fuel cells (SOFCs) have the highest energy efficiency, and can configure systems with various capacities suitable for power demands due to a high degree of freedom in size, shape, or capacity, and thus have a very wide of applications from ultra-small power supplies for portable electronic devices to large combined generation systems. Especially, the easily modularized solid oxide fuel cells can be developed for almost all the ranges of energy sources from MW-grade micro-power devices to hundreds of MW-grade large-sized power generation systems substituting for existing grid-type power generation systems.

Solid oxide fuel cells correspond to the only fuel cell technology that is also applicable to existing fossil fuel systems. Hydrogen used in most fuel cells is the most ideal fuel for the future, but the hydrogen production and storage problems restrict the range of applications of fuel cells. Considering the economic feasibility of fuel cells as energy sources in Korean situations where hydrogen supply infrastructures are not established, the efficient utilization of hydrocarbon-based fuels, such as LPG and LNG, is very important in market creation and long-term development/distribution of fuel cells. Particularly, internal reforming SOFCs do not use expensive external reforming, and thus have simple systems and can use existing infrastructures for fuel supply and demand. Therefore, such SOFCs are expected to have a great ripple effect as future energy sources.

In the conventional art with respect to the manufacture of such solid oxide fuel cells, the firing temperature of the electrolyte is similar to the temperature of the anode, but the firing temperature of the cathode is remarkably different from the firing temperatures of the electrolyte and the anode, and thus, the solid oxide fuel cell was manufactured through a two-step firing process in which a laminated body of the electrolyte and the anode was fired and subsequently the cathode was screen-printed on the fired electrolyte, followed by firing again.

However, the firing process is performed twice as described above, resulting in undesirable problems in the process economy, such as extending the process time and increasing the process cost.

SUMMARY OF THE INVENTION

In view of the foregoing, the present disclosure is to provide a method for manufacturing a large-area thin film solid oxide fuel cell with excellent performance to simplify the manufacturing process.

In accordance with an aspect of the present disclosure, there is provided a method for manufacturing a large-area thin-film solid oxide fuel cell, the method including: preparing an anode support slurry, an anode functional layer slurry, an electrolyte slurry, and a buffer layer slurry for tape casting; preparing an anode support green film, an anode functional layer green film, an electrolyte green film, and a buffer layer green film by tape casting the slurries onto carrier films; staking the green films, followed by hot press and warm iso-static press (WIP), to prepare a laminated body; and co-sintering the laminated body.

The manufacturing method of the present disclosure is economical since large-area thin film solid oxide fuel cells with excellent performance can be manufactured through a simple one-step process.

Furthermore, the cells produced by the manufacturing method of the present disclosure showed a dense microstructure, favorable interfacial adhesion, structural uniformity, and low gas permeability. In the present disclosure, large-area and high-quality cells can be produced through tape casting and lamination. Furthermore, a very thin buffer layer can be implemented through tape casting.

Through interfacial consistency between the anode support, anode functional layer, electrolyte, and buffer layer, the thickness of the electrolyte can be precisely controlled and the thickness of each individual layer can be reduced to the thinnest limit. Therefore, electrochemical performance and long-term stability of the cells can be maximized.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EXEMPLARY EMBODIMENTS

Hereinafter, various embodiments of the present disclosure are described with reference to the accompanied drawings. It should be understood that embodiments and terminologies used herein are not intended to limit the technology described in the present disclosure to particular forms of embodiments, but to cover various modifications, equivalents, and/or alternatives of corresponding embodiments.

A method for manufacturing a large-area thin film solid oxide fuel cell according to various embodiments of the present disclosure will be described with reference to FIG. 1.

Figure 1:
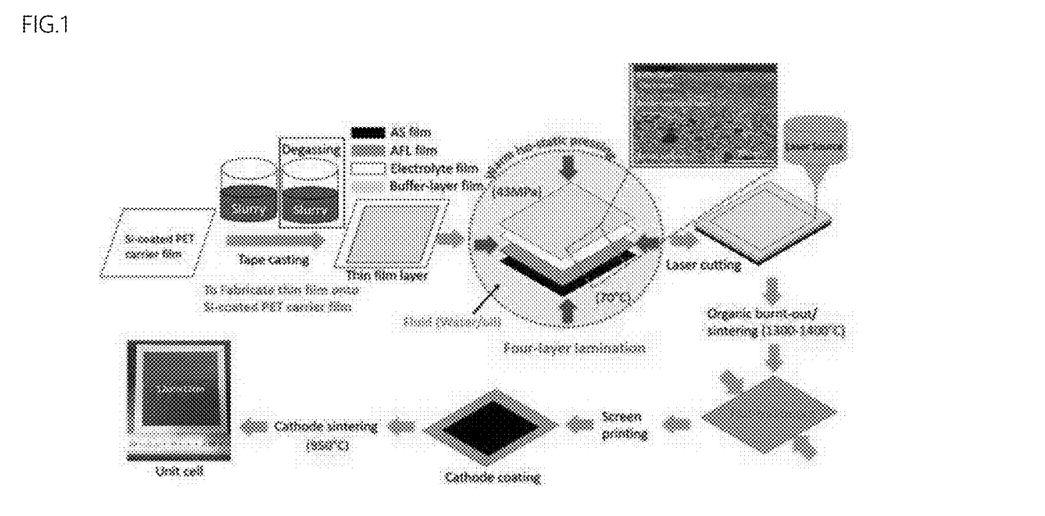
FIG. 1 shows a detailed manufacturing process of a four-layered structure SOFC.

FIG. 1 shows a detailed manufacturing process of a four-layered thin film structure SOFC.

A method for manufacturing a large-area thin-film solid oxide fuel cell according to various embodiments of the present disclosure includes: preparing an anode support slurry, an anode functional layer slurry, an electrolyte slurry, and a buffer layer slurry for tape casting; preparing an anode support green film, an anode functional layer green film, an electrolyte green film, and a buffer layer green film by tape casting the slurries onto carrier films; staking the green films, followed by hot press and warm iso-static press (WIP), to prepare a laminated body; and co-sintering the laminated body.

First, in the preparing of the slurries, the anode support slurry, the anode functional layer slurry, the electrolyte slurry, and the buffer layer slurry may be prepared to have particular compositions and viscosities.

Specifically, the anode support slurry may contain, relative to the entire weight thereof, 10-14 wt % of a pore former, 8-12 wt % of a binder, 1-3 wt % of a surfactant, 1-3 wt % of a dispersion, and a plasticizer, the plasticizer to binder ratio being 0.3-0.5.

The anode functional layer slurry may contain, relative to the entire weight thereof, 8-12 wt % of a binder, 1-3 wt % of a surfactant, 1-3 wt % of a dispersion, and a plasticizer, the plasticizer to binder ratio being 0.3-0.5.

The electrolyte slurry may contain, relative to the entire weight thereof, 6-10 wt % of a binder, 1-3 wt % of a surfactant, 1-3 wt % of a dispersion, and a plasticizer, the plasticizer to binder ratio being 0.3-0.5.

The buffer layer slurry may contain, relative to the entire weight thereof, 3-7 wt % of a binder, 1-3 wt % of a surfactant, 1-3 wt % of a dispersion, and the plasticizer to binder ratio being 0.3-0.5. The buffer layer slurry may contain a GDC powder having a surface area of 10-13 m$^2$/g.

The anode support layer slurry may have a viscosity of 1400-1550 Cp, the anode functional layer slurry may have a viscosity of 1200-1300 Cp, the electrolyte slurry may have a viscosity of 300-400 Cp, and the buffer layer slurry may have a viscosity of 150-250 Cp.

Such optimization of the composition and viscosity of each slurry enables tape casting employing a lip coater and attains the optimization of mechanical strength, strain rates, and microstructures of green films prepared by tape casting.

Then, in the preparing of the green films, the green films may be prepared by tape casting the slurries onto the carrier films. The tape casting may be performed at a rate of 0.5-1 cm s$^{-1}$ and a temperature of 30-70° C.

The thicknesses of the prepared green films may be 35-40 μm for the anode support, 10-18 μm for the anode functional layer, 1-10 μm for the electrolyte (ScCeSZ), and 1-3 μm for the buffer layer (GDC).

Then, the green films may be laminated and subjected to hot press. The hot press may be performed at a pressure of 40-60 MPa and a temperature of 50-90° C.

After the hot press, lamination may be performed at a temperature of 40-60° C. with rotation of the green films at 90°. Such rotation can mitigate the residual internal stress of the films and provide uniform shapes thereof.

Then, the WIP may be performed in a water/oil medium at a pressure of 40-50 MPa and a temperature of 50-90° C.

Then, the prepared laminated body may be co-sintered. In the co-sintering, heat treatment may be performed at 25° C. to 1300-1400° C. for 59 hours.

The co-sintering may include dwelling at 300-400° C. for 4-6 hours; and dwelling at 500-700° C. for 3-5 hours. Such sintering conditions can produce defect-free cells.

Then, the sintered laminated body may be subjected to flattening treatment.

Hereinafter, the present disclosure will be described in detail through examples and test examples.

These examples and test examples are provided only for the purpose of illustrating the present disclosure in more detail, and therefore, according to the purpose of the present disclosure, it would be apparent to a person skilled in the art that these examples and test examples are not construed to limit the scope of the present disclosure.

<Example 1> Preparation of Slurries for Tape Casting

To prepare a NiO-8YSZ anode support slurry, commercially available powders of nickelous oxide green (NiO, kojundu, Japan), fine YSZ (8YSZ, LTC, South Korea), coarse YSZ (8YSZ, LTC, South Korea), and carbon black (Orion, Engineered Carbon, USA) as a pore former were prepared, and poly vinyl butyl (PVB79, Thermo Fisher Scientific) as a commercial binder, dibutyl phthalate (DBP, Junsei, Japan) as a plasticizer, and Triton X 100 (Samchun, South Korea) as a surfactant, and fish oil (San NOPCO limited, Japan) as a dispersion were added to the slurry to prepare a compositionally homogeneous slurry. Also, to prepare slurries for NiO/ScCeSZ anode functional layer (AFL), Scandia-stabilized zirconia ScCeSZ (fuel cell material, USA) electrolyte, and GDC (fuel cell material, USA) buffer layer, poly vinyl butyl (PVB79, Thermo Fisher Scientific) as a commercial binder, dibutyl phthalate (DBP, Junsei, Japan) as a plasticizer, and Triton X 100 (Samchun, South Korea) as a surfactant, and fish oil (San NOPCO limited, Japan) as a dispersion were added to the slurries to prepare compositionally homogeneous slurries.

The compositions of the slurries for tape casting of the anode support, anode functional layer, electrolyte, and buffer layer are shown in Table 1 below.

TABLE 1

| Layer | Compositions | Pore-Former | Binder | Plasticizer/Binder | Surfactant | Dispersion | Solvent |
|---|---|---|---|---|---|---|---|
| Anode support | NiO-YSZ | 12% | 10% | 0.4 | 2% | 2% | IPA and toluene |
| AFL | NiO-ScCeSZ | — | 10% | 0.4 | 2% | 2% | IPA and toluene |
| Electrolyte | ScCeSZ | — | 8% | 0.4 | 2% | 2% | IPA and toluene |
| Buffer layer | GDC10 | — | 5% | 0.4 | 2% | 2% | IPA and toluene |

First, a surfactant and a dispersion were mixed in an azeotropic mixture of toluene and isopropyl alcohol (IPA) for 24 hours, followed by ball milling, and a binder and a plasticizer solution were added thereto, followed by ball milling again for 24 hours, thereby forming each homogeneous slurry. To remove trapped air bubbles before tape casting, the slurry was degassed for about 10 minutes and filtered using a mesh.

Such optimization of the composition and viscosity of each slurry enables tape casting employing a lip coater and attains the optimization of mechanical strength, strain rates, and microstructure of green films prepared by tape casting.

<Test Example 1> Measurement of Viscosities of Slurries for Tape Casting

Figure 2:
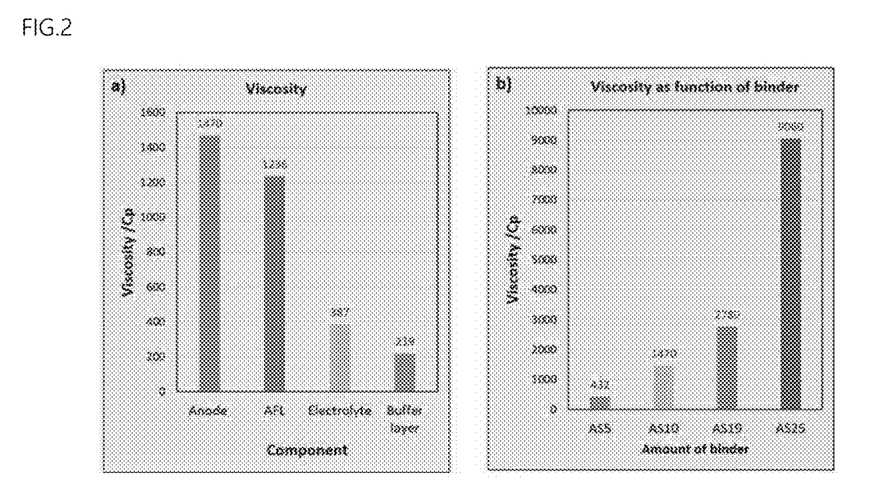
FIG. 2 shows graphs illustrating the viscosities of the anode support, anode functional layer, electrolyte, and buffer layer.

The viscosities of the slurries were measured by a viscometer. FIG. 2 shows graphs illustrating the viscosities of the anode support, anode functional layer, electrolyte, and buffer layer. Referring to FIG. 2A, the viscosity of the anode support slurry was relatively higher than those of the other components due to a high solid fraction. The viscosities of the optimized anode support, anode functional layer, electrolyte, and buffer layer were 1470 Cp, 1236 Cp, 387 Cp, and 219 Cp, respectively.

FIG. 2B is a graph illustrating the viscosity of the anode support slurry according to the amount of the binder. Referring to FIG. 2B, the viscosity of the slurry increased as the amount of the binder increased to 5%, 10%, 19%, and 25%.

<Example 2> Preparation of Green Films

Each of the slurries prepared in Example 1 was coated at 50° C. and a rate of 0.5-1 cm s$^{-1}$ on a Si-coated polyethylene (PET) carrier film through a comma blade by using a tape casting machine (Hansung system Inc., Korea).

The thicknesses of the prepared green films were 35-40 μm for the anode support, 15-18 μm for the anode functional layer, 5-10 μm for the electrolyte (ScCeSZ), and 2-3 μm for the buffer layer (GDC).

<Example 3> Lamination Process

Green films with a size of 18 cm×18 cm for the anode support, anode functional layer, electrolyte, and buffer layer were stacked, and laminated by hot press and warm isostatic press (WIP) (WIP Yeung Inc., South Korea).

In the hot press for mitigating the residual internal stress, two green films stacked in the same composition were placed between two hot plates at a temperature of 70° C. and a pressure of 40-60 MPa for 2 minutes. Si-coated PET films were attached to upper and lower surfaces of the stacked films. Such temperature, pressure, and time conditions were optimized for the lamination process. The temperature may vary depending on organic phases present in the green films, that is, the binder, plasticizer, surfactant, and dispersion. As for the pressure, a pressure optimized for attachment between layers needs to be applied. Thereafter, the stacked films were rotated clockwise by 90°. Meanwhile, the lamination was performed at 50° C., which is the glass transition temperature of the PVB binder, to accelerate flowing. All the green films were subjected to lamination as shown in Table 2 below, and then WIP was performed to improve the density change and interfacial adhesion by removing air bubbles trapped between the multi-layered thin films. The WIP was performed in a water/oil medium at 43 MPa and 70° C. for 15 minutes.

TABLE 2

| | Green film lamination | | | | |
|---|---|---|---|---|---|
| Name | No. of anode support layer | No. of AFL layer | No. of Electrolyte layer | No. of Buffer layer | Final sintered cell (μm) |
| Thick cell | 32 | 1 | 1 | 1 | 700 |
| Thin cell | 18 | 1 | 1 | 1 | 400 |
| Ultra-thin cell | 7 | 1 | 1 | 1 | 180 |

<Test Example 2> WIP Effect Comparison

Figure 3:
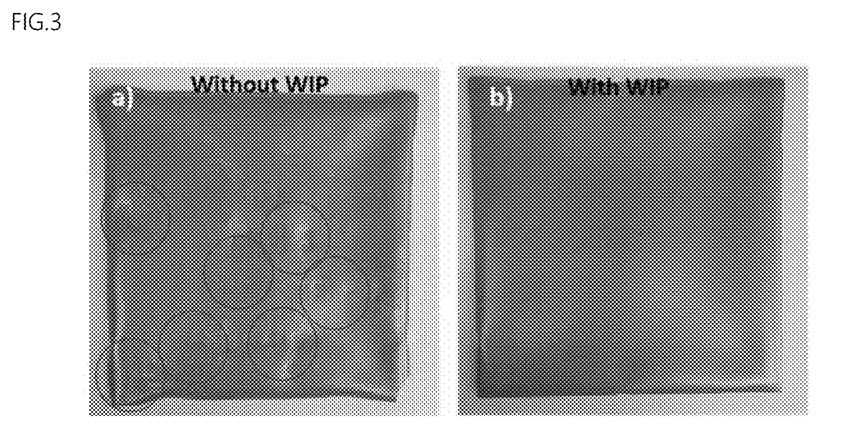
FIG. 3 shows images for investigating the effects according to the presence or absence of WIP.

The WIP process can minimize the local thickness change and improve the density change. That is, referring to FIG. 3A, when WIP was not performed, the green films shrank due to density changes of green films, resulting in a relatively small thickness. However, referring to FIG. 3B, the green films were uniform when WIP was performed.

<Example 4> Co-Sintering Process

For organic burn-out and co-sintering, a four-layered thin film green body was heat treated at 25° C. to 1300-1400° C. for 59 hours. A flattening treatment was performed with a heat ramping of 1.66° C./min with the application of a load of 15.25 g/cm$^2$.

<Test Example 3> Porosity of Anode Support According to Amount of Pore Former Added A porous anode support is essential for effective gas transport. Therefore, a test was conducted by changing the amount of the pore former in order to derive the optimized porosity. The porosity of the anode support NiO—YSZ was measured using a mercury (Hg) porosimeter while the sintering temperature and amount of the pore former were changed and the binder was maintained in a constant amount of 10 wt %.

Figure 4:
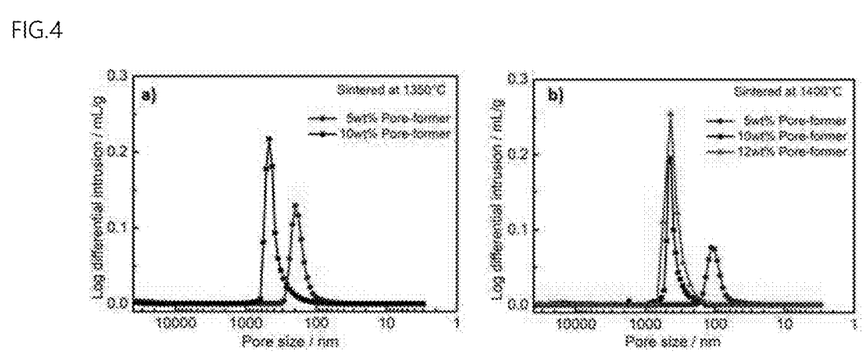
FIG. 4 shows graphs of the measurement results of porosity according to the content of a pore former.

As a result, referring to FIG. 4B, the porosities of the anode support sintered at 1400° C. when the carbon black pore former was contained in 5, 10, and 12 wt % were 11.58, 17.43, and 25.16%, respectively.

Referring to FIG. 4A, the porosities of the anode support sintered at 1350° C. when the pore former was contained in 5 and 10 wt % were 13 and 17%, respectively, showing higher porosities compared with the anode support sintered at 1400° C.

However, a low sintering temperature results in low mechanical strength of the anode, so that the amount of the pore former added was determined as 12 wt %, thereby securing a sufficient porosity of 25.16% in the sintering at 1400° C.

Table 3 below shows a pore distribution of the anode support when the amount of the pore former added was 12 wt %. Referring to Table 3, the anode was observed to show no micro/macro defects and peeling cracks and have uniform consistency between micropores and mesopores.

TABLE 3

| | |
|---|---|
| Median pore diameter (volume) at 414.75 psia and 0.030 mL/g | 436 nm |
| Median pore diameter (area) at 464.53 psia and 0.291 m$^2$/g | 389 nm |
| Average pore diameter | 411 nm |
| Bulk density at 0.50 psia | 4.71 g/mL |
| Apparent (skeletal) density at 59,940.33 psia | 6.55 g/mL |
| Porosity | 25.20% |

<Test Example 4> Mechanical Strength According to Plasticizer to Binder Ratio

The ceramic powder properties have a significant influence on green films by defining quality, strength, and flexibility, and thus are very important to obtain a stable slurry composition for tape casting. Since a film can retain sufficient thermal compression capability when the film has high mechanical strength, the mechanical properties are an important factor in the stacking of multi-layered thin films.

Figure 5:
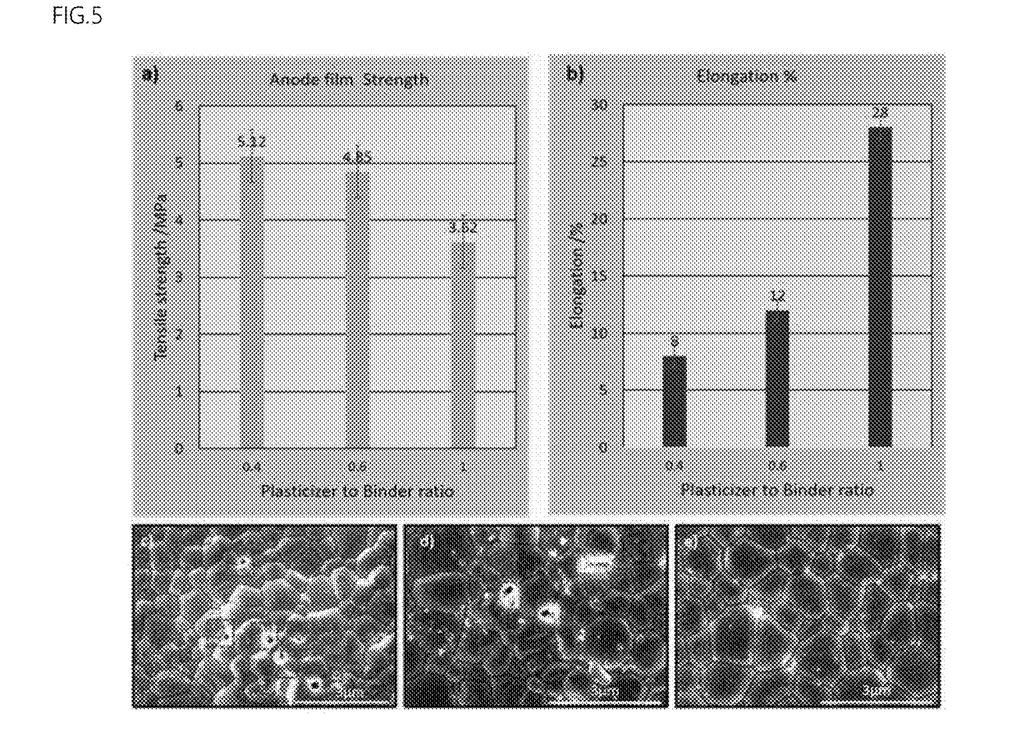
FIG. 5 illustrates tensile strength and film fracture elongation according to p/b.

The mechanical properties of the thin film were assessed at different plasticizer to binder ratios (p/b). FIG. 5 shows tensile strength and film fracture elongation according to p/b. Referring to FIG. 5A, the monolayer tensile strengths of the green film were 3.62 MPa, 4.85 MPa, and 5.12 MPa when p/b values were 1, 0.6, and 0.4, respectively. Referring to FIG. 5B, the elongation was only 8% when p/b was 0.4, but reached up to 28% when p/b was 1. The film elongation increases as the content of a plasticizer increases. In addition, the tensile strength of a film increases as the content of a plasticizer increases. Therefore, it can be seen that the less the plasticizer content, the higher the mechanical strength. A p/b of 0.4 is the minimum ratio for use in the tape casting process, and thus a preferable plasticizer to binder ratio in the present disclosure was determined to be 0.4.

FIGS. 5C, 5D, and 5E are SEM images of GDC films when the p/b values were 1, 0.6, and 0.4, respectively.

Referring to FIGS. 5C and 5D, the GDC films having a high content of a plasticizer showed little pores, and referring to FIG. 5E, the density was very high at the lowest p/b. These high-density buffer layers effectively prevent surface diffusion along the wall pores.

<Test Example 5> Microstructure of Anode Support

Figure 6:
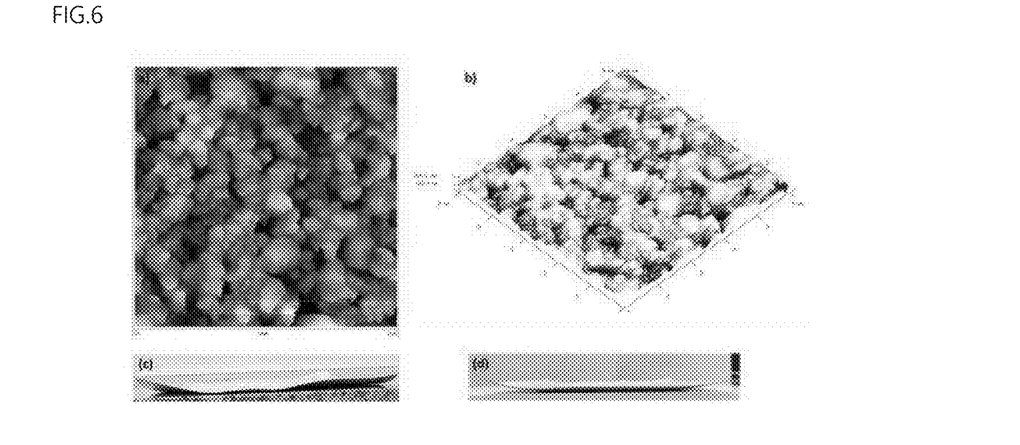
FIG. 6 shows two-dimensional (2D) and three-dimensional (3D) atomic force microscopy (AFM) images of an anode support green film.

The chemical properties of organic components used in tape casting have a great influence on green films during co-sintering. FIGS. 6A and 6B are two-dimensional (2D) and three-dimensional (3D) atomic force microscopy (AFM) images of the green film of the anode support. The surface topographic scan analysis provides roughness parameter skewness and kurtosis.

Referring to FIGS. 6A and 6B, the negative skew value of the green film was −0.9, clearly indicating that hills and valleys were dominant on the green film. The kurtosis of the green film was 4.4, indicating a sharp but non-bumpy surface, which was consistent with the images. The anode was a thickest portion of the cell, and thus is very important in SOFC. The hills and valleys of the anode support have an influence on the uniformity of a cell obtained by organic burn-out and co-sintering. This was confirmed by laminating substrates in another casting direction and co-sintering the same.

Referring to FIG. 6C, the substrate and the film were heat laminated in the same casting direction, and a cell with a non-uniform shape was obtained after sintering due to the internal stress (hills and valleys) during sintering and co-sintering. In the presence of surface irregularities, such as substrate distortion and substrate surface smoothness, the electrolyte layer completely covers the buffer layer GDC and has a great influence on structural uniformity and stability of the thin films.

However, referring to FIG. 6D, the substrate and the film were heat laminated while repeatedly rotated clockwise by 90° to mitigate the residual internal stress of the tape, leading to a uniform shape. The cell uniformity was confirmed to result in the incorporation of respective layers into a uniform aggregate during organic burn-out and co-sintering, through the rotating heat lamination conditions.

<Test Example 6> TGA and DSC Analyses

TGA and DSC analyses were performed to investigate thermal properties of respective components and thin green films of a laminated body (green half-cell) and to determine the decomposition range of organic additives. To prevent the shrinkage effect of the sintered substrate, it is important to remove organic additives (a dispersion, a surfactant, a plasticizer, and a binder) before co-sintering.

Figure 7:
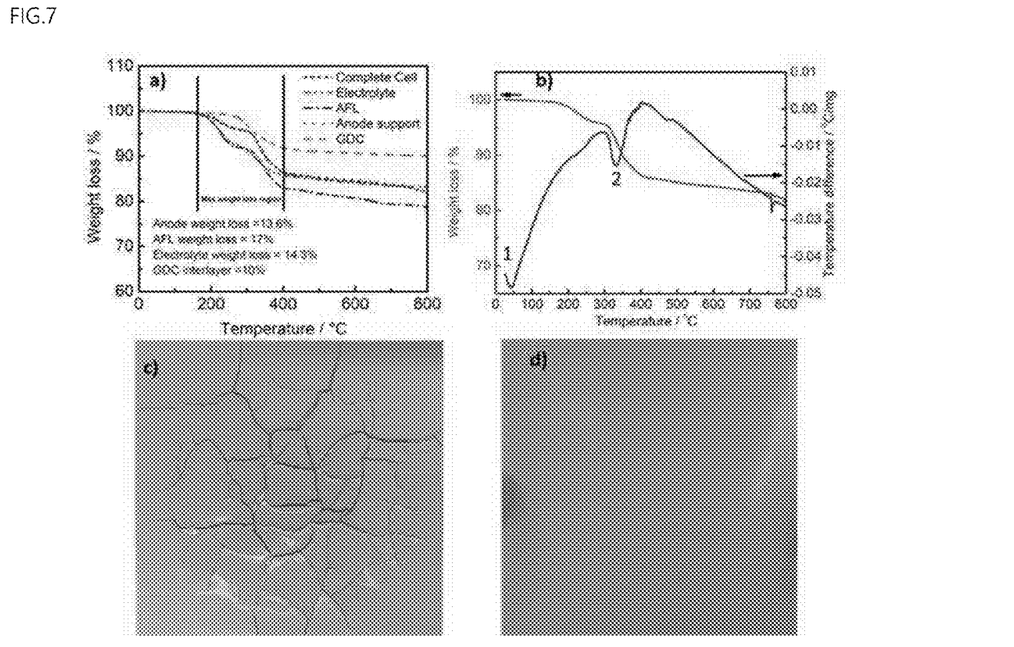
FIG. 7 illustrates TGA and DSC analysis results.

Referring to FIG. 7A, in TGA, the maximum weight losses were observed in a temperature range of 200-400° C. All the organic additives were burned out in this temperature range.

Referring to FIG. 7B, the first endothermic peak indicates the glass transition Tg temperature of the binder, 50° C. The second endothermic peak corresponds to the weight loss between 350 and 400° C. and is due to the decomposition of organic additives in the film. The weight losses of the anode support, anode functional layer, electrolyte, and buffer layer (GDC) were 17%, 13%, 14.3%, and 10%, respectively. Therefore, the heating rate is important in this range.

Based on these results, the ramping rate and dwell time were changed and optimized, thereby obtaining a high-density film with a uniform microstructure having an influence on electrochemical performance. The organic burn-out under such conditions can also minimize defects, such as de-lamination, cracks, and anisotropic shrinkage during sintering.

Referring to FIG. 7C, large cracks were formed during rapid burn-out of organic additives. However, referring to FIG. 7D, a defect-free cell could be obtained when a very low ramping rate of 0.25° C./min, two dwelling segments at 350° C. for 5 hours and at 600° C. for 4 hours were included in the sintering conditions. A high heat ramping rate causes multiple cracks in cells since organic molecules escape at a high rate. Hence, it is important that organic material burn-out is slow and is stably maintained, in order to allow organic materials to escape without the destruction of a ceramic structure.

<Test Example 7> Minimization of Mismatch Stress and Distortion of Four-Layered SOFC During Co-Sintering To assess the feasibility of manufacturing a four-layered thin film cell through co-sintering, the shrinkage behaviors of the anode support, anode functional layer, electrolyte, and buffer layer were assessed. For homogeneity of the packing structure and each film, the shrinkage of each layer needs to be close to the overall shrinkage, and the shrinkage mismatch of each layer needs to be minimized. However, the anode support, anode functional layer, electrolyte, and buffer layer of the SOFC require different morphologies. Therefore, a powder having particular properties needs to be carefully selected for each film.

Figure 8:
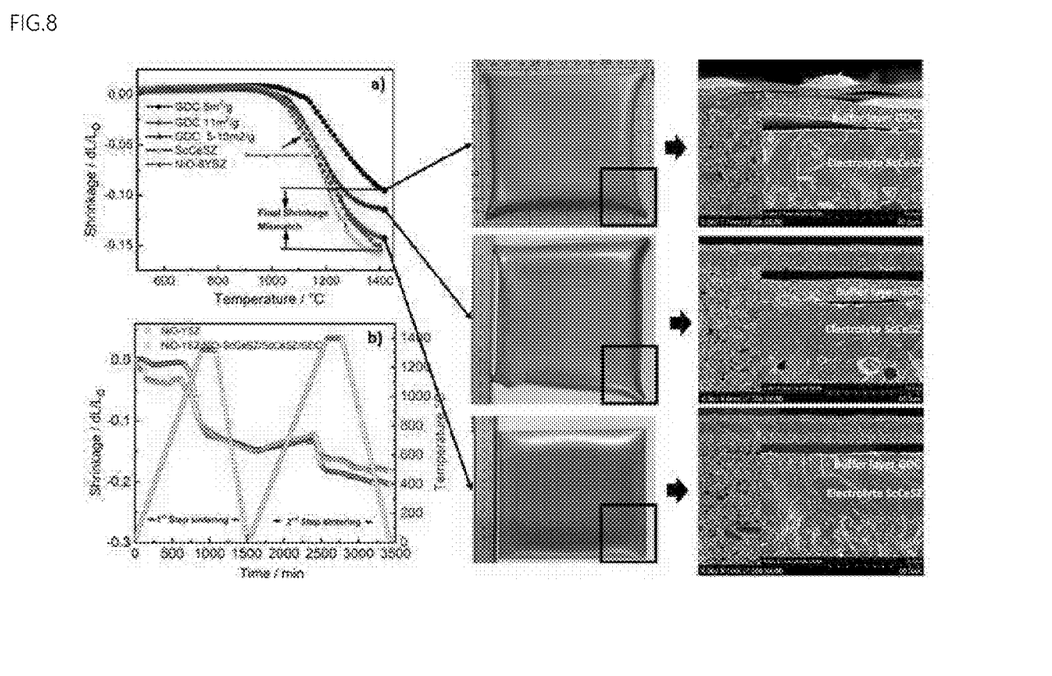
FIG. 8 illustrates dilatometric analysis results.

The aforementioned properties associated with sintering may be assessed by dilatometric analysis shown in FIG. 8. FIG. 8A shows the linear shrinkages as a function of temperature for NiO—YSZ, ScCeSZ, and GDC with relatively coarse and fine grain sizes. These show different shrinkage behaviors, which are attributed to the grain shape and size. The interface between the electrolyte and the buffer layer is known to be vulnerable to mechanical failure and interface weakness in conventional SOFCs, and the interface is also noticeable in the cell structures due to rigid substrate properties and material discontinuity.

The anode support is a thickest portion of the multi-layered cell, and the shrinkage mismatch with the other components can easily induce a processing defect in a thin layer during co-sintering. To reduce the shrinkage mismatch between NiO—YSZ, ScCeSZ and GDC, various surface areas of the GDC powder were investigated. Referring to FIG. 8A, the 11 $m^2/g$ GDC powder showed better matches in the overall shrinkage and the shrinkage rate, but the 5 $m^2/g$ and 5-10 (ULSA) $m^2/g$ powders showed a mismatch in the overall shrinkage, resulting in the interface de-lamination and film densification deterioration.

Figure 9:
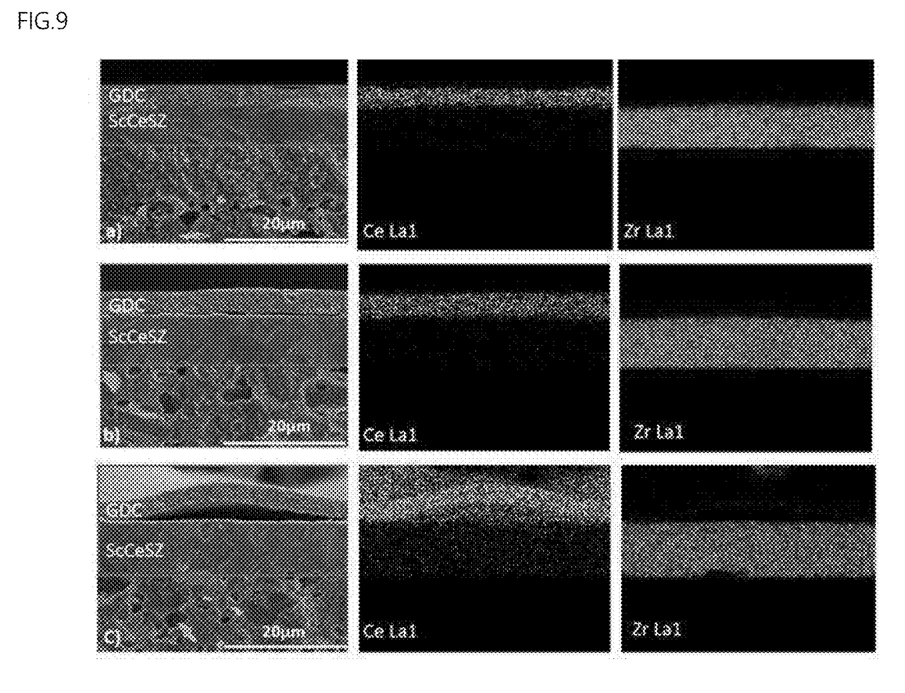
FIG. 9 illustrates SEM and ESX mapping results.

Referring to FIG. 9A, the GDC having a surface area of 11 $m^2/g$ consistently showed strong adhesion between the electrolyte and the buffer layer, leading to a remarkably improved interfacial adhesion state. However, referring to FIGS. 9B and 9C, the shrinkage stress of GDCs with surface areas of 5 $m^2/g$ and 5-10 (ULSA) $m^2/g$ reflected the shrinkage stress mismatch occurring during co-sintering, resulting in a defect, such as a de-lamination crack, and weak interfacial adhesion. The mismatch of the overall shrinkage rate results in a weak interfacial structure, pin holes, cracks, and de-lamination.

Figure 10:
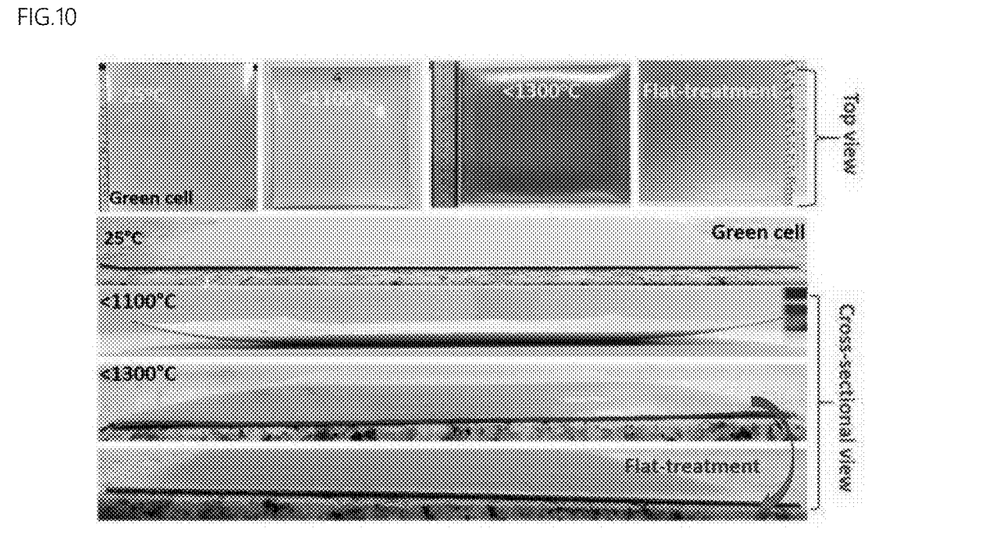
FIG. 10 shows top views and cross-sectional views confirming the distortion changes of a four-layered thin film SOFCs (NiO—YSZ, NiO—ScCeSZ, ScCeSZ, and GDC) structure during co-sintering at different temperatures.

FIG. 10 shows top views and cross-sectional views confirming the distortion changes of a four-layered thin film SOFC (NiO—YSZ, NiO—ScCeSZ, ScCeSZ, and GDC) structure during co-sintering at different temperatures.

The four-layered thin film SOFC showed a rapid change from convex to concave during co-sintering. This indicates that the structural change of the multi-layered SOFCs is sensitive to temperature. The cause for this change can be explained based on the shrinkage kinetics and the initial grain size. The maximum shrinkage occurs in the thin ScCeSZ and GDC layers at a low temperature, and ultimately, the cells develop towards the NiO—YSZ anode support at a high temperature.

<Test Example 8> Morphology Analysis of Four-Layered Thin Film SOFC

Figure 11:
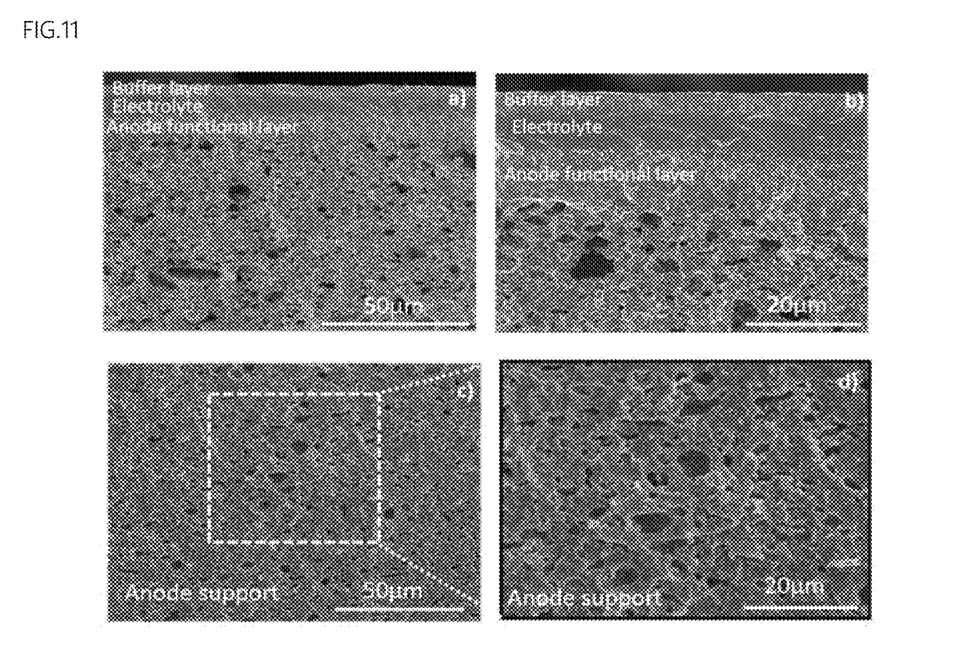
FIG. 11 shows SEM images of co-sintered four individual layers of NiO—YSZ NiO—ScCeSZ/ScCeSZ/GDC.

FIG. 11 shows SEM images of four individual layers of co-sintered NiO—YSZ/NiO-ScCeSZ/ScCeSZ/GDC. A porous NiO—YSZ anode support for easy gas transport ($H_2$, CO, and $CH_4$) was disposed at the bottom to minimize the concentration polarization.

A thin electrolyte with a thickness of 5-6 μm and a buffer layer with a thickness of 2-3 μm were also prepared by tape casting. Referring to FIGS. 11A and 11B, the layers were almost uniform without cracks or conspicuous pores. Structural defects were not observed in all of the four layers after co-sintering. No trapped air bubbles were observed in the buffer layer, and the interfacial adhesion was excellent between the anode support, anode functional layer, electrolyte, and buffer layer. Referring to FIGS. 11C and 11D, the anode support showed a typical porous microstructure.

Figure 12:
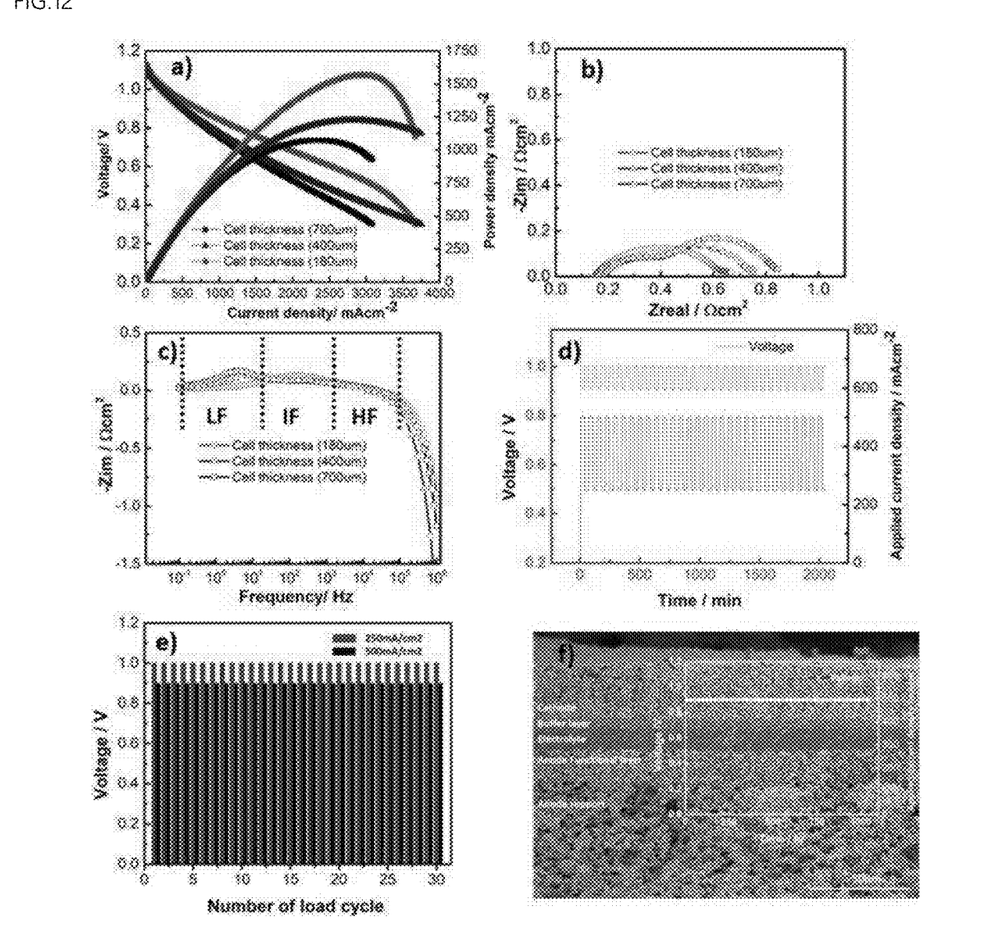
FIG. 12 illustrates current-voltage (I-V), current-power (I-P), current load cycling, and long-term characteristics of single cells.

<Test Example 9> Electrochemical Performance and Impedance Spectroscopy Measurements To assess the reliability, stability, and robustness of a four-layered thin film SOFC for electrochemical performance, cells including anode supports with various thicknesses were manufactured with an effective electrode area of 1 cm×1 cm and electrochemically characterized using $H_2$ humidified at 700° C. as a fuel and air as an oxidizer. The current-voltage (I-V), current-power (I-P), current load cycling, and long-term characteristics of single cell at a temperature of 700° C. are shown in FIG. 12. The open-circuit voltage (OCV) was about 1.1 V across the over cells, very close to the theoretical value. These results indicate excellent airtightness through a thin electrolyte or a glass sealant and are well consistent with the SEM observations. These results also support that microscopic and macroscopic defects need to be removed to prevent the electrolyte leakage during multilayer sintering. The maximum power densities were 1.6, 1.24, and 0.99 W/cm² at 700° C., and these results indicate as shown in FIG. 12A that the cell performance can be significantly improved by the reducing the thickness of the anode support.

To analyze the electrode polarization resistance, impedance spectroscopy was measured in an open-circuit voltage state at 700° C. by using different temperatures. Referring to FIG. 12B, the EIS results obtained in an open-circuit voltage (OCV) state are shown. The ohmic resistances corresponding to interception in the high-frequency region of 180, 400, and 700 μm thick cells were almost the same. The polarization resistances of the ultra-thin and thin cells (180 and 400 μm) were smaller than that of the thick cell (700 μm). The electrode polarization resistances (Rp) at 700° C. were 0.51, 0.57, and 0.68 $\Omega cm^2$ for the ultra-thin, thin, and thick cells, respectively.

Referring to FIG. 12C, the impedance of the cell containing the ultra-thin film anode support was lower in the low-frequency range. Since the composition, the thickness of the bilayer electrolyte, and the co-sintering temperature of the cathode were the same throughout all the cells, the polarization difference may occur due to only the anode structure (anode support thickness).

To investigate the robustness of four-layered thin film SOFCs, the cells were investigated in a critical current density range. FIGS. 12D and 12E show the voltage response for the current load cycling change in cells, between 250-500 mAcm$^{-2}$ (current density) in which a constant humidification $H_2$ flow was identified. Referring to FIG. 12D, the voltage drop being $\Delta V=0.02\%$, and the voltage of the cells was very stably maintained during 30-load cycles for a cumulative time of 2000 minutes. Since most cathode materials, such as LSC or LSCF, exhibit chemical dilation due to the non-stoichiometric oxygen increase in a polar state and do not exactly match the coefficient of thermal expansion of the electrolyte, these cycles are important with respect to the cathode/electrolyte interface. The interfacial adhesion may be reduced by the composition at the interface and the microstructure change. The formation of micropores and secondary phases, which exhibit a low coefficient of thermal expansion, results in the interfacial deterioration.

FIG. 12F shows a microstructure of the interface after 30 current load cycles. After the constant current operation of the cell, the de-lamination of the interface was not observed and a stable voltage was obtained. Subsequently, the cathode was sintered with an appropriate temperature profile to ensure excellent mechanical adhesion of the cathode layer. Therefore, the mechanical stress at the interface is minimized due to the strong adhesion. In the test analysis after cycling, all the thin films of ScCeSZ, GDC, and LSC were shown to maintain structural integrity without microscopic and macroscopic or mechanical defects.

As a result of cell analysis after long-term testing, there was found a decomposition phenomenon due to a chemical interaction between the cathode and the electrolyte. The most remarkable decomposition mechanism is that La and Sr migrate from the cathode to the electrolyte via the buffer layer through gas diffusion and surface diffusion along wall pores, thereby forming secondary phases known as $SrZrO_3$ and $La_2Zr_2O_7$. A ceria-based layer is required to have a high density in order to ensure low ohmic and prevent inter-diffusion of cathode cations (La and Sr) to the electrolyte surface through pores. The formation of secondary phases was reduced by a very thin, dense, and stable buffer layer prepared through a T-C film approach process.

Figure 13:
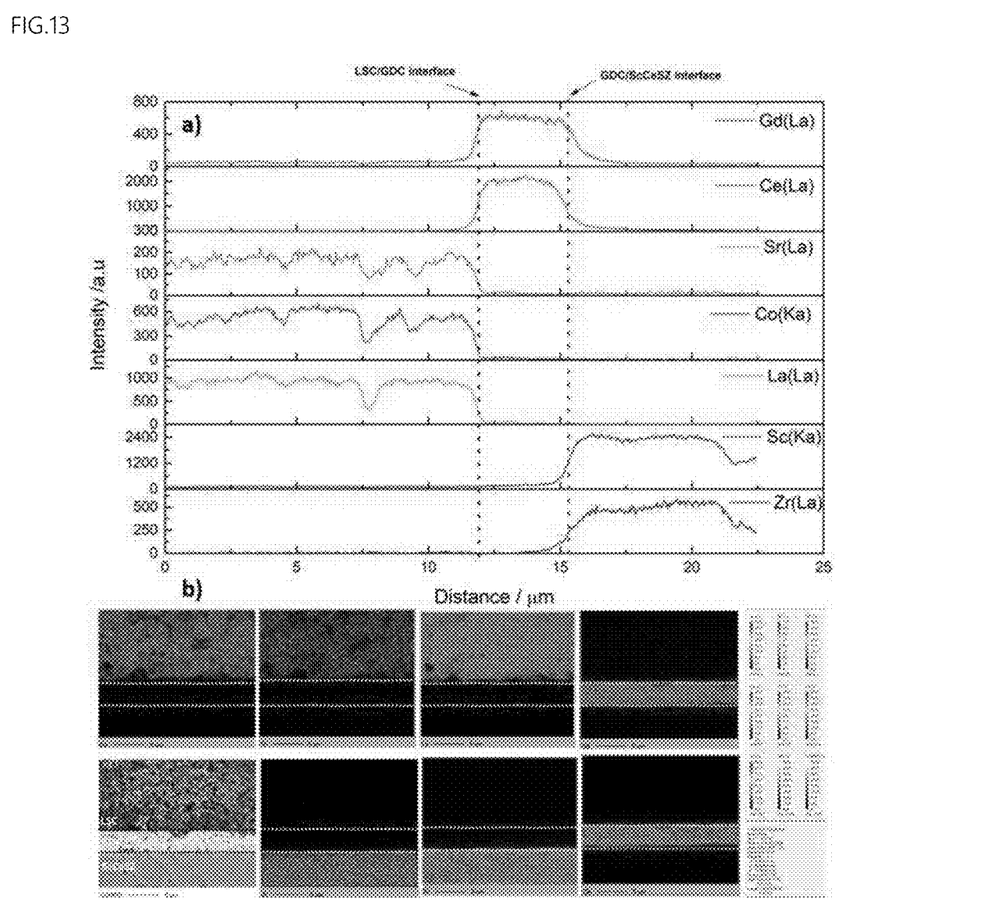
FIG. 13 illustrates WDS line scanning and WDS element mapping results after testing of a four-layered structure SOFC (100 hours).

Referring to FIGS. 13A and 13B, Sr and La were not detected in the interface between the buffer layer and the electrolyte. Therefore, the formation of $SrZrO_3$ and $La_2Zr_2O_7$ and the chemical de-mixing of LSC were successfully prevented during cell manufacturing and long-term operation.

Figure 14:
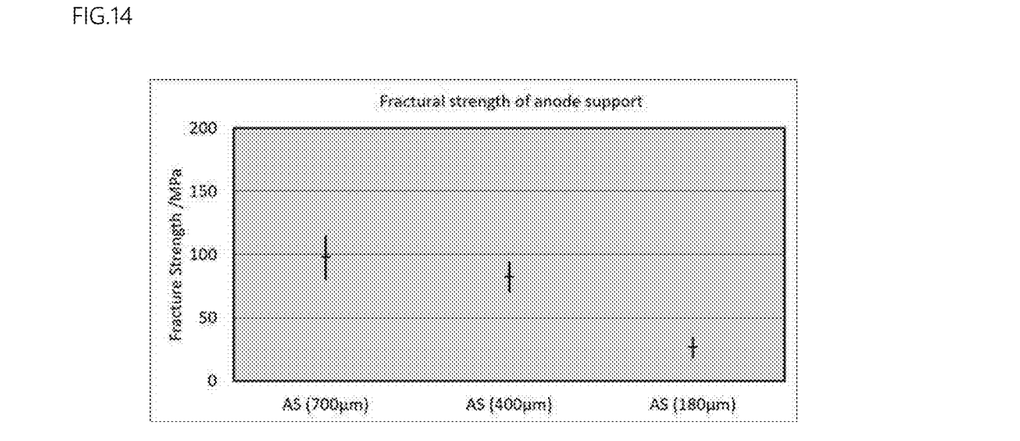
FIG. 14 illustrates the fracture strength of the oxidized NiO—YSZ according to the thickness of the anode support.

The compatibility and practical application of a large-area (12 cm×12 cm) SOFC with a four-layered thin film structure were further confirmed through assessment and construction. Mechanical reliability is important for both long-term operation and assembly of SOFCs. The mechanical robustness of SOFCs depends entirely on the critical strength of the anode support. To assess mechanical strength, the thickness of the anode support was varied to 700, 400, and 180 μm. FIG. 14 shows the fracture strengths of the oxidized NiO—YSZ. The strengths of the anode support were 94, 82, and 25 MPa for 700, 400, and 180 μm, respectively. A cell including a 180-μm anode support has very low fracture strength, and thus cannot be operated. However, the 700- and 400-μm thick anode supports showed reasonable mechanical strength, and large-area cells (12 cm×12 cm) were electrochemically characterized.

Figure 15:
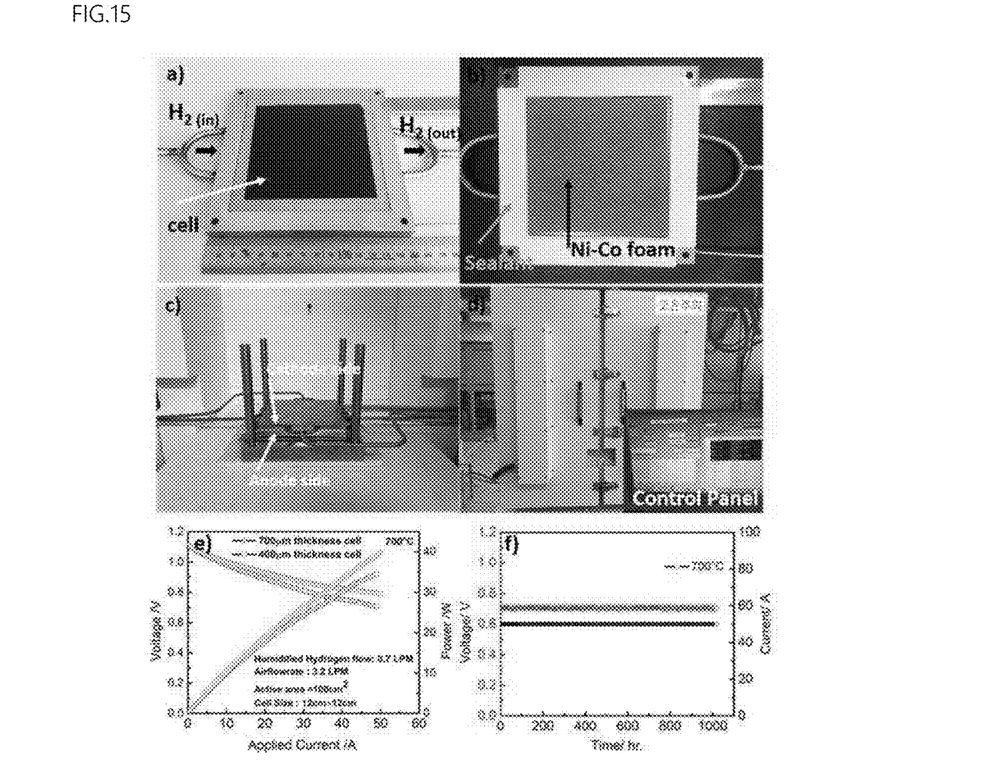
FIG. 15 illustrates the assessment results of electrochemical properties and long-term stability of a large-area single cell (12 cm×12 cm).

Single cells were manufactured using metal interconnects, a Ni-foam as an anode current collector, a Ni—Co foam as a cathode current collector, and a glass-ceramic sealant. FIGS. 15A to 15D show actual images of the single cells. The electrochemical performance and OCV of the cell measured at 700° C. were close to the theoretical value indicating the leak tightness. Referring to FIG. 15E, the large-area single cells with thicknesses of 700 and 400 μm exhibited powers of 35 W and 40.8 W at 50 A, respectively. Referring to FIG. 15F, as for the long-term stability of the single cell, a total current of 50 A was applied at 700° C. for 1000 hours, and the cell voltage was reduced from 0.705 V to 0.703 V ($\Delta V=3$ mV), showing a very low deterioration rate of 0.2% kh$^{-1}$. For the application of SOFC technology to markets, a lifetime of more than 40,000 hours with a power loss of less than 10% is required, which corresponds to a deterioration rate of less than 0.25% kh$^{-1}$. Referring to Table 4 below, the integration of the reliable four-layered thin film structure planar SOFCs is effective in lowering the deterioration rate and cost. That is, the present disclosure can attain important lifetime requirements of SOFCs for technology commercialization.

TABLE 4

| Name | Final sintered cell thickness (μm) | % age increment in power density | % age reduction Material usage (anode support) |
|---|---|---|---|
| Thick cell | 700 | Reference | Reference |
| Thin cell | 400 | 30 | 42% |
| Ultra-thin cell | 180 | 60 | 74% |

The features, structures, effects, and the like described in the above exemplary embodiments are included in at least one exemplary embodiment of the present disclosure and are not necessarily limited to one exemplary embodiment. Furthermore, the features, structures, effects, and the like illustrated in each exemplary embodiment may be combined or modified into other exemplary embodiments by those skilled in the art to which the exemplary embodiments pertain. Accordingly, the contents related to such combination or modification should be interpreted as being included in the scope of the disclosure.

The present disclosure has been described mainly with reference to exemplary embodiments, but these exemplary embodiments are merely exemplified and do not limit the present disclosure. It will be understood by those skilled in the art that various modifications and applications, not illustrated above, may be made without departing from the substantial features of the present disclosure. For example, respective elements specifically shown in the exemplary embodiments can be modified and implemented. It should be interpreted that differences related to such modifications and applications are included in the scope of the present disclosure defined in the appended claims.

What is claimed is:

1. A method for manufacturing a large-area thin-film solid oxide fuel cell, the method comprising:
preparing an anode support slurry, an anode functional layer slurry, an electrolyte slurry, and a buffer layer slurry for tape casting;
preparing an anode support green film, an anode functional layer green film, an electrolyte green film, and a buffer layer green film by tape casting the slurries onto carrier films;

staking the green films, followed by hot press and warm iso-static press (WIP), to prepare a laminated body; and co-sintering the laminated body.

2. The method of claim 1, wherein the anode support slurry contains, relative to the entire weight thereof, 10-14 wt % of a pore former, 8-12 wt % of a binder, 1-3 wt % of a surfactant, 1-3 wt % of a dispersion, and a plasticizer, the plasticizer to binder ratio being 0.3-0.5.

3. The method of claim 1, wherein the anode functional layer slurry contains, relative to the entire weight thereof, 8-12 wt % of a binder, 1-3 wt % of a surfactant, 1-3 wt % of a dispersion, and a plasticizer, the plasticizer to binder ratio being 0.3-0.5.

4. The method of claim 1, wherein the electrolyte slurry contains, relative to the entire weight thereof, 6-10 wt % of a binder, 1-3 wt % of a surfactant, 1-3 wt % of a dispersion, and a plasticizer, the plasticizer to binder ratio being 0.3-0.5.

5. The method of claim 1, wherein the buffer layer slurry contains, relative to the entire weight thereof, 3-7 wt % of a binder, 1-3 wt % of a surfactant, 1-3 wt % of a dispersion, and a plasticizer, the plasticizer to binder ratio being 0.3-0.5.

6. The method of claim 1, wherein the anode support layer slurry has a viscosity of 1400-1550 Cp, the anode functional layer slurry has a viscosity of 1200-1300 Cp, the electrolyte slurry has a viscosity of 300-400 Cp, and the buffer layer slurry has a viscosity of 150-250 Cp.

7. The method of claim 1, wherein the tape casting is performed at a rate of 0.5-1 cm $s^{-1}$ and a temperature of 30-70° C.

8. The method of claim 1, wherein the hot press is performed at a pressure of 40-60 MPa and a temperature of 50-90° C.

9. The method of claim 1, wherein, after the hot press, lamination is performed at a temperature of 40-60° C. with rotation of the green films by 90°.

10. The method of claim 1, wherein the WIP is performed in a water/oil medium at a pressure of 40-50 MPa and a temperature of 50-90° C.

11. The method of claim 1, wherein the co-sintering is performed at 1300-1400° C.

12. A large-area thin film solid oxide fuel cell manufactured by the method of claim 1.

* * * * *